United States Patent [19]

Midorikawa

[11] 4,353,872

[45] Oct. 12, 1982

[54] CATALYTIC CONVERTER

[75] Inventor: Minoru Midorikawa, Koganei, Japan

[73] Assignee: Nissan Motor Co., Ltd., Yokohama, Japan

[21] Appl. No.: 241,069

[22] Filed: Mar. 6, 1981

[30] Foreign Application Priority Data

Mar. 7, 1980 [JP] Japan .............................. 55-28831[U]

[51] Int. Cl.³ .............................................. F01N 3/10
[52] U.S. Cl. .................................... 422/179; 60/299;
422/177; 422/180
[58] Field of Search ...................... 422/177, 179, 180;
60/299–302

[56] References Cited

U.S. PATENT DOCUMENTS

| | | | |
|---|---|---|---|
| 3,912,459 | 10/1975 | Kearsley | 422/179 |
| 4,101,280 | 7/1978 | Frietzsche et al. | 422/180 |
| 4,142,864 | 3/1979 | Rosynsky et al. | 422/179 |
| 4,143,117 | 3/1979 | Gaysert | 422/179 |
| 4,163,041 | 7/1979 | Gaysert | 422/179 |
| 4,209,494 | 6/1980 | Oya et al. | 422/179 |

Primary Examiner—Richard L. Chiesa
Attorney, Agent, or Firm—Lowe, King, Price & Becker

[57] ABSTRACT

A catalytic converter comprises a monolithic catalyst within a casing, a gas seal member disposed around a part of the catalyst outer surface, a wire netting disposed around the remaining part of the catalyst outer surface and interposed between the casing inner surface and the catalyst outer surface, a protector member interposed between the casing inner surface and the gas seal member outer surface, the protector member being securely connected to the wire netting, thereby preventing the gas seal member from being damaged due to contact thereof with the converter casing during assembly of the catalytic converter.

4 Claims, 4 Drawing Figures

CATALYTIC CONVERTER

BACKGROUND OF THE INVENTION

1. Field of the Invention

The present invention relates in general to an improvement in a catalytic converter for purifying exhaust gas from an internal combustion engine, and more particularly to a protecting device for a gas seal member is interposed between a catalytic converter casing and a monolithic catalyst.

2. Description of the Prior Art

In connection with a catalytic converter using a monolithic catalyst, the catalyst is usually formed of a ceramic material or the like and therefore it is necessary to interpose a damper member between the monolithic catalyst and a converter casing in order to prevent damage of the monolithic catalyst, and also necessary to insert a gas seal member between the monolithic catalyst and the converter casing in order to prevent exhaust gas from leaking via the clearance between the catalyst and the converter casing.

BRIEF SUMMARY OF THE INVENTION

A catalytic converter according to the present invention comprises a monolithic catalyst disposed within a converter casing so as to form a space between the inner surface of the casing and the outer surface of the catalyst. A gas seal member is disposed around a part of the catalyst outer surface. A wire netting is disposed around the remaining part of the catalyst outer surface and interposed between the casing inner surface and the catalyst outer surface. Additionally, a protector member for the gas seal member is interposed between the gas seal member outer surface and the casing inner surface, the protector member being securely connected to the wire netting. With the thus arranged catalytic converter, the gas seal member is prevented from being damaged due to contact thereof with the converter casing during assembly of the catalytic converter, thereby rendering assembly of the catalytic converter easier.

BRIEF DESCRIPTION OF THE DRAWINGS

The features and advantages of the catalytic converter according to the present invention will be more apparent from the following description taken in conjunction with the accompanying drawings in which the same reference numerals and characters designate the same parts and elements, and in which.

DETAILED DESCRIPTION OF THE INVENTION

Figure 1:
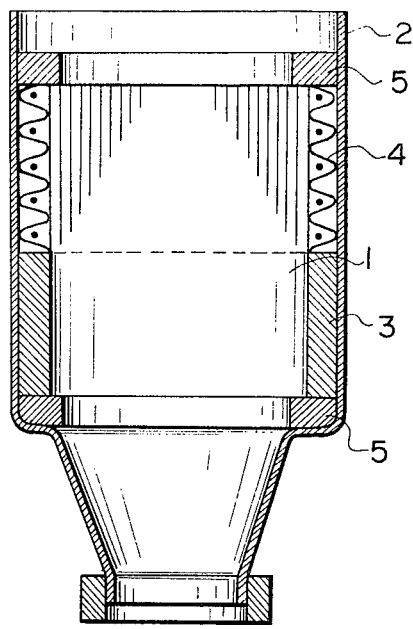
FIG. 1 is a longitudinal sectional view of a conventional catalytic converter.

To facilitate an understanding the present invention, a brief reference will be made to a conventional catalytic converter, depicted in FIG. 1. Referring to FIG. 1, the conventional catalytic converter is formed with an annular space between the outer surface of a honeycomb type monolithic catalyst 1 and the inner surface of a converter casing 2. Within the lower half of this annular space in the drawing, an expandable gas seal member 3 is disposed to provide a gas-tight seal between the catalyst outer surface and the converter casing inner surface, while within the upper half of the annular space, knitted wire 4 is disposed to damp vibration and to obtain a gas-tight seal. The reference numeral 5 designates a gas seal member which also serves as a damper member which receives the thrust applied to the catalyst.

In assembling this catalytic converter, it is difficult to forcedly insert the gas seal member 3 and the knitted wire 4 into the space between the catalyst outer surface and the converter casing inner surface after the catalyst 1 has been disposed within the converter casing. Accordingly, in practice, the gas seal member 3 and the knitted wire 4 are previously wound at the required sections on the outer surface of the monolithic catalyst, and thereafter the thus formed article is forced into the converter casing. However, even this method for assembling the catalytic converter has encountered problems where the gas seal member is damaged or broken when being forced into the converter casing, thereby losing the gas-tight seal between the catalyst outer surface and the converter casing inner surface.

Figure 2:
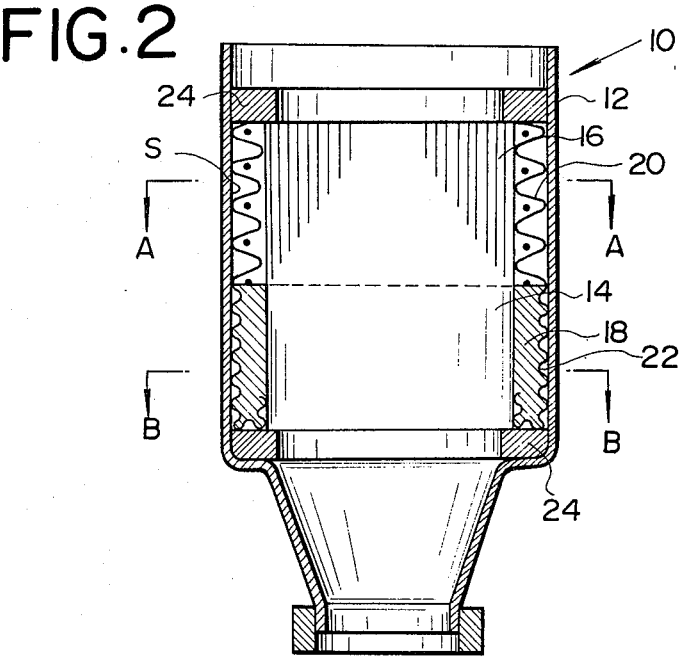
FIG. 2 is a longitudinal sectional view of a preferred embodiment of a catalytic converter in accordance with the present invention.
Figure 3:
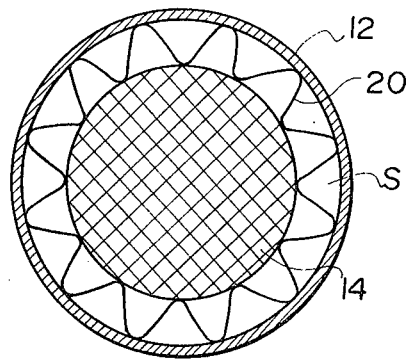
FIG. 3 is a transverse sectional view taken in the direction of the arrows substantially along the line A—A of FIG. 2.
Figure 4:
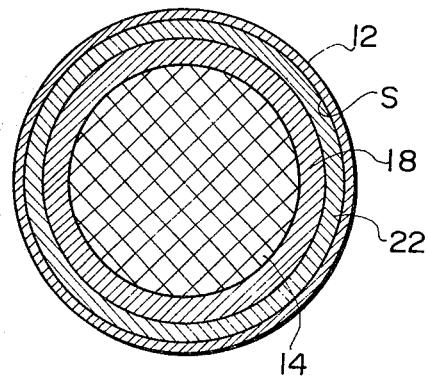
FIG. 4 is a transverse sectional view taken in the direction of the arrows substantially along the line B—B of FIG. 2.

In view of the above description of the conventional catalytic converter, reference is made to FIGS. 2 to 4, wherein a preferred embodiment of the catalytic converter according to the present invention is illustrated by the reference numeral 10. The catalytic converter 10 comprises a casing 12 whose major part is generally cylindrical. A cylindrical honeycomb type monolithic catalyst 14 is disposed within the casing 12 so as to form an annular space S between the outer surface of the catalyst 14 and the inner surface of the casing 12. The honeycomb type monolithic catalyst 14 is usually formed with a plurality of gas passages 16 which extend in parallel and axially from one end surface thereof to the other opposite end surface thereof. This catalyst 14 is formed of a honeycomb type monolithic catalyst carrier made of a ceramic material or the like, carrying a catalytic material thereon though not shown. Within the lower half of the annular space S in FIG. 2, a generally cylindrical gas seal member 18 is disposed to obtain gas-tight seal within the space S. The gas seal member 18 is formed of a heat-resistant and expandable sheet material, for example, vermiculite, quartz or asbestos. Within the remaining part of the annular space S, a generally cylindrical knitted wire or resilient support member 20 is placed to resiliently support the catalyst 14 within the casing 12, damping the external force applied to the catalyst 14.

Additionally, a generally cylindrical protection member 22 for the gas seal member 18 is disposed to cover the gas seal member 18 and be located between the outer surface of the gas seal member and the inner surface of the casing 12. In this instance, the protection member 22 is formed of the same knitted wire as 20 and is integral with the knitted wire 20. The reference numeral 24 designates a seal member for maintaining the gas-tight seal between the catalyst 16 and the casing 12, which seal member also serves as a damper member for receiving the thrust applied to the catalyst 14.

The thus arranged catalytic converter 10 is assembled as follows: The gas seal member 18 is initially wound at the required portion on the outer surface of the catalyst 14. Subsequently, the knitted wire 20 is wound at the remaining portion on the catalyst outer surface. The protection member 22 is also wound on the gas seal member 18 simultaneously with the winding of the knitted wire 20. In this instance, the protection member 22 is formed by flattening an elongate section of the knitted wire 20. This is preferable and advantageous in that the protection member 22 can be installed simultaneously with the installation of the knitted wire 20, and additionally no difference in level is formed on the outer surfaces of the knitted wire 20 and the protection member 22. Furthermore, it is also preferable to bend the lower section or the free end section of the protection member 22 or the knitted wire to wrap the lower end of the gas seal member 18 as shown in FIG. 2.

After the gas seal member 18, the knitted wire 20 and the protection member 22 are installed at the required locations of the monolithic catalyst 14, and the catalyst 14 is forceably inserted into the casing 12. It will be understood that the gas seal member 18 can be prevented from contacting with the casing 12 when the monolithic catalyst 14 forceably inserted into the casing because the gas seal member is covered by the protection member 22 extending from the knitted wire 20. This prevents damage of the gas seal member 18 because of contacting the seal member 18 with the casing 12, decreasing the insertion resistance of the monolithic catalyst into the casing, and improving the locating operation of the catalyst relative to the casing at the begining of the insertion of the catalyst. Therefore, with the catalytic converter having the above-mentioned construction, the operation efficiency of inserting the monolithic catalyst can be improved and additionally the gas sealing performance after assembly can be improved.

While the protection member 22 has been shown and described as being formed of the elongate section of the knitted wire 20 in the embodiment hereinbefore described, it will be appreciated that the protection member 22 may be formed of a different material from that of the knitted wire, for example, of a thin metal sheet securely connected with the knitted wire 20 so that the metal sheet covers the outer surface of the gas seal member 18. Although only the knitted wire 20 has been shown and described as the resilient support member for the catalyst, the knitted wire is replaceable with other wire nettings which can function to damp the external force applied to the monolithic catalyst.

As appreciated from the above, according to the present invention, the outer surface of the gas seal member is covered with the protection member which elongates from the knitted wire serving as the resilient support member for the monolithic catalyst, thereby avoiding contacting of the gas seal member with the converter casing during insertion of the monolithic catalyst with the gas seal member into the converter casing. Consequently, the gas seal member is prevented from being damaged due to the contact thereof with the converter casing, rendering assembly of the catalytic converter easier.

What is claimed is:

1. A catalytic converter having a casing, comprising:
   a monolithic catalyst disposed in the casing so as to form a space between the inner surface of the casing and the outer surface of said monolithic catalyst;
   a gas seal member disposed around a part of the outer surface of said catalyst, said gas seal member being formed of a heat-resistant and expandable sheet material selected from the group consisting of vermiculite, quartz, and asbestos;
   a wire netting disposed around the remaining part of the outer surface of said catalyst and interposed between the inner surface of the casing and the outer surface of said catalyst; and
   a protector member interposed between the inner surface of the casing and the outer surface of said gas seal member, said protector member being integral with said wire netting and made of the same material as that of said wire netting, said protector member being an elongate section extending from said wire netting and forming part of said wire netting, said elongate section being so flattened as to readily enter a narrow space between the outer surface of said gas seal member and the inner surface of the casing, the outer surface of said elongate section being substantially at the same level as that of said wire netting, the free end part of elongate section being so bent as to wrap the end section of said gas seal member.

2. A catalytic converter as claimed in claim 1, wherein said wire netting is a knitted wire.

3. A catalytic converter as claimed in claim 1, wherein said monolithic catalyst is cylindrical and of honeycomb type, in which said catalyst is formed with a plurality of gas passages which are parallel and axially extend from an end surface thereof to the other opposite end surface thereof.

4. A catalytic converter comprising:
   a casing having a cylindrical section whose inner diameter is the same throughout its complete length and;
   a cylindrical monolithic catalyst whose diameter is the same throughout its complete length, said catalyst being disposed within the cylindrical section of said casing so as to form an annular space between the inner surface of the casing and the outer surface of said catalyst;
   a generally cylindrical gas seal member located within said annular space and disposed around a part of the outer surface of said catalyst, said gas seal member being formed of a heat-resistant and expandable sheet material selected from the group consisting of vermiculite, quartz, and asbestos;
   a wire netting located within said annular space and disposed around the remaining part of the outer surface of said catalyst, said wire netting being interposed between the inner surface of said casing cylindrical section and the outer surface of said catalyst; and
   a protector member interposed between the inner surface of said casing cylindrical section and the outer surface of said gas seal member, said protector member being integral with said wire netting and made of the same material as that of said wire netting, said protector member being an elongate section extending from said wire netting and forming part of said wire netting, said elongate section being so flattened as to readily enter a narrow space between the outer surface of said gas seal member and the inner surface of said casing cylindrical section, the outer surface of said elongate section being substantially the same level as that of said wire netting so that the outer surfaces thereof contact the inner surface of said casing cylindrical section, the free end part of said elongate section being so bent as to wrap the end section of said gas seal member.

* * * * *